UNITED STATES PATENT OFFICE.

JOHN J. MONTGOMERY, OF FRUITLAND, CALIFORNIA.

DEVULCANIZING AND RESTORING VULCANIZED RUBBER.

SPECIFICATION forming part of Letters Patent No. 308,189, dated November 18, 1884.

Application filed May 27, 1884. (No specimens.)

*To all whom it may concern:*

Be it known that I, JOHN J. MONTGOMERY, of Fruitland, county of San Diego, and State of California, have invented an Improvement in Devulcanizing and Restoring Vulcanized Rubber; and I hereby declare the following to be a full, clear, and exact description thereof.

My invention relates to a new and useful improvement in devulcanizing and restoring vulcanized rubber to a condition in which it can be reworked; and my invention consists in cutting up the rubber into fine particles, immersing it in a suitable hydrocarbon oil obtained from petroleum, and subjecting it in a tight vessel with the oil to a temperature above 350° Fahrenheit, until it is reduced to a doughy or plastic mass, from which the oils are extracted by heat, either alone or assisted by jets of steam passed through the mass, or carried farther to a complete solution, from which the oil remaining may or may not be extracted by the means aforesaid, as I shall hereinafter fully describe.

The object of my invention is to devulcanize the rubber and reduce it to a condition (without injuring or destroying its properties) in which it can readily be reworked for any purpose or may be vulcanized again.

The following is a particular description of my process or improvement: The rubber is finely cut and immersed in hydrocarbon oils obtained from petroleum, and subjected to a temperature above 350° Fahrenheit and ranging upward to a temperature at which the dry distillation of rubber begins, or at which its properties are likely to be injuriously affected, say, about 600° Fahrenheit, for a period of time varying from one to twelve hours, according to the amount of sulphur in the rubber, the size of the rubber particles, the temperature maintained, and whether the rubber is to be reduced to a workable doughy mass or a complete solution. The oils used should be such as have not too high or too low a boiling-point. If one having too low a boiling-point is used, it will pass off before the most favorable point of devulcanization is reached, which is between 400° and 500° Fahrenheit, unless restrained by excessively strong vessels; but if one having too high a boiling-point is used, it will present serious difficulties to its extraction after devulcanization is complete. For example, the low-boiling oil benzine may be used, but that would require the use of an extremely strong vessel to retain it at the required temperature, or; on the other hand, an oil boiling as high as 600° Fahrenheit or even higher may be used, in which case the necessity of having a strong containing-vessel is obviated, but there will be more trouble in extracting the oil at the completion of the process. The oils which have given the most satisfaction are those boiling from 400° to 430° Fahrenheit, for they can be retained at 500° Fahrenheit by a vessel capable of withstanding a pressure of sixty or seventy pounds, and are easily disposed of at the end. Preparatory to this process it is preferable to allow the rubber to remain immersed in the oil for about twelve hours, during which time it will absorb sufficient oil to devulcanize it, but it is advisable to add a small excess of oil when the rubber is put in the heating-vessel; but, if desired, the rubber need not be previously soaked, but placed directly in the vessel with enough oil to immerse it, though the exact quantity is not limited. However the process proceeds better with an abundance of oil. During the process the rubber passes through two important stages. In the first it becomes a doughy workable mass, and is applicable in all cases where solid rubber is used, but seems insoluble in the ordinary solvents of rubber. In the second stage the rubber passes into a complete solution, and retains the property of being dissolved again after the devulcanizing-oils are extracted. The vessel used should be closed and capable of withstanding greater or less pressure, as indicated by the oil used and the temperature maintained. It should be provided with stirring-paddles, and for safety a pressure-gage and escape-valve, and heated either in a bath or continuously over a slow fire, with occasional stirring of the rubber to prevent its sticking and burning. When the process is complete, whether it be in the first or second stage, it will be necessary for all purposes with the doughy or plastic mass and for most purposes with the complete solution to extract the devulcanizing-oils. To do this the mass is kept hot and stirred while the pressure is removed, or while the heat and stirring are continued the evaporation may be hastened by passing steam through the rubber until the desired consistency is attained, and in either case, if so desired, the vapors arising may be condensed for future use. The rubber thus treated can be reworked and revulcanized.

In submitting my improvement I am aware of patented processes of treating vulcanized rubber with various oils, resins, and other substances under various conditions and certain specified temperatures, including the mere softening of ground rubber by heating it to 320° Fahrenheit in crude petroleum, in which process the heavy oils are not extracted from the plastic mass, and the necessary temperature is not attained which seems necessary for devulcanization or reduction to a complete solution.

I am also aware of the heating of caoutchouc with various hydrocarbon oils to 250° or 300° Centigrade, but it is not for the purpose of devulcanization, as vulcanized rubber is not used.

I am also aware of the freeing of rubber from solvents by the action of hot air and steam; but this process is essentially different, as it is accomplished by the action of air and steam on the surface of rubber and not through the mass. Furthermore, as in the process I use the passage of air would be detrimental to the rubber at the higher temperature named, I use steam alone.

Having thus described my invention, what I claim as new, and desire to secure by Letters Patent, is—

1. The improvement in devulcanizing and restoring vulcanized rubber, consisting in heating in a closed vessel the finely-cut particles of the rubber with hydrocarbon oils obtained from petroleum to a temperature above 350° Fahrenheit until it is reduced to a doughy or plastic mass, and then in removing or driving off said oils by means of heat alone or by heat assisted by jets of steam passed through the mass, substantially as herein described.

2. The improvement in devulcanizing and restoring vulcanized rubber, consisting in heating in a closed vessel the finely-cut particles of the rubber with hydrocarbon oils obtained from petroleum to a temperature above 350° Fahrenheit until it is reduced to a complete solution, from which the oils remaining in the mass may or may not be extracted, as desired, substantially as herein described.

In witness whereof I have hereunto set my hand.

JOHN J. MONTGOMERY.

Witnesses:
  CHAS. H. DODGE,
  J. H. BLOOD.